(12) United States Patent
Presezzi et al.

(10) Patent No.: US 11,796,096 B2
(45) Date of Patent: Oct. 24, 2023

(54) AIR LOCK SYSTEM

(71) Applicant: BIOFORCETECH CORPORATION, Newark, DE (US)

(72) Inventors: Dario Presezzi, San Francisco, CA (US); Valentino Villa, Belmont, CA (US); Marco Mosciarello, San Francisco, CA (US); Stefano Pessina, San Francisco, CA (US); Mattia Bonfanti, San Mateo, CA (US)

(73) Assignee: BIOFORCE TECH CORPORATION, Newark, DE (US)

( * ) Notice: Subject to any disclaimer, the term of this patent is extended or adjusted under 35 U.S.C. 154(b) by 575 days.

(21) Appl. No.: 16/481,996

(22) PCT Filed: Feb. 3, 2018

(86) PCT No.: PCT/US2018/016763
§ 371 (c)(1),
(2) Date: Jul. 30, 2019

(87) PCT Pub. No.: WO2018/148118
PCT Pub. Date: Aug. 16, 2018

(65) Prior Publication Data
US 2019/0390804 A1    Dec. 26, 2019

Related U.S. Application Data

(60) Provisional application No. 62/455,885, filed on Feb. 7, 2017.

(51) Int. Cl.
*F16L 23/24* (2006.01)
*F16J 15/02* (2006.01)
*F16L 23/16* (2006.01)

(52) U.S. Cl.
CPC ............. *F16L 23/24* (2013.01); *F16J 15/028* (2013.01); *F16L 23/162* (2013.01)

(58) Field of Classification Search
CPC ........ F16L 23/24; F16L 23/162; F16J 15/028; F16J 15/106
See application file for complete search history.

(56) References Cited

U.S. PATENT DOCUMENTS

| | | | |
|---|---|---|---|
| 2,532,891 A | 12/1950 | Chupp | |
| 2,998,269 A | 4/1961 | Houghton | |
| 3,747,963 A | 7/1973 | Shivak | |
| 5,645,301 A | 7/1997 | Kingsford et al. | |
| 7,004,470 B2 | 2/2006 | Hystad | |
| 8,104,349 B2 | 1/2012 | Kubota et al. | |
| 8,684,363 B2 * | 4/2014 | Krejci | F16J 15/122 277/609 |

FOREIGN PATENT DOCUMENTS

EP    1267049    12/2002

* cited by examiner

*Primary Examiner* — James M Hewitt, II
(74) *Attorney, Agent, or Firm* — LAW OFFICES OF STEVEN W. WEINRIEB

(57) ABSTRACT

The techniques introduced here include a system and method for efficiently connecting two or more pipes through the combination of a pushing plate, a gasket and a sealing plate. Such techniques exploit the presence of concentric protuberances, or rings, on the sealing plate that help, also thanks to the space between them, in keeping the cleanness, tightness and flexibility of the conjunction, especially when sticky substances, like a sludge, are dealt with.

18 Claims, 4 Drawing Sheets

AIR LOCK SYSTEM

FIELD OF THE INVENTION

The invention generally relates to a self-cleaning, flexible and tight system for connecting two or more pipes.

BACKGROUND OF THE INVENTION

Valves and pipe connectors in general are commonly used when two or more pipes have to be connected or reconnected together. Their function is not merely to make air, a fluid or other substances to go from one pipe to another pipe but they also need to have other characteristics.

In particular, in peculiar contexts, pipe connectors have to ensure the tightness of the connection, so that no air, liquid or other material (at least to a certain extent) drops out from the connection between the two pipes, including in the moment they are connected and/or disconnected.

The above-referenced need is exacerbated when the pipes to be connected do not remain in a fixed position for a long time, but they have to be detached and reconnected very often as part of an industrial process. In that case, it is often very hard to maintain the tightness and to connect the pipes with precision one time after the other.

Moreover, especially when dealing with certain sticky substances, like sludges, pipe connectors need to be cleaned continuously, because otherwise the substance can remain within the connector and reduce its tightness. The problem, as recalled above, is even worse if an industrial process requires the pipe to connect and disconnect continuously.

In the past, the problem of creating a tight connection between two often disconnecting pipes has been solved by a system of cones interconnecting one with the other, but the system has not proved to be so efficient, especially when sludges are involved. In that case, in fact, not only the tightness is not optimal and there is a risk that the pipes are not workably aligned, but another issue remains: the connector must be cleaned continuously in order not to compromise its ability to work.

SUMMARY OF THE INVENTION

Embodiments of the present disclosure include a system to connect two or more pipes which have to be frequently connected and disconnected in a way in which not only preserves tightness but also leaves the connection point clean when dealing with sludges and other similarly sticky materials. Such connection can be performed using a pushing plate, a gasket and a sealing plate.

In an embodiment of the disclosure, such sealing plate presents on its surface or embedded in its surface two or multiple concentric protuberances or rings (if the shape of the pipe is that of a cylinder) that allow the sealing plate to be connected more flexibly to a pipe. If there is not a perfect match with the first ring, then the pipe can be connected in the area covered by the second ring (and so one when more than 2 rings are present), but the tightness is preserved. Such flexibility overcomes many difficult situations, including defects in the construction of the pipes and misalignments generated by wrong software computing, and also helps when the connecting point between two pipes is not perfectly clean, because the dirt is automatically deposited in the space amongst the rings and does not impact on the tightness of the conjunction. The flexibility which is granted by the rings can also overcome a misalignment (vertical, horizontal or diagonal) of the pipes to be connected up to at least 20 mm at 1 bar pressure when at least 2 rings are present, which is something that in the past was impossible to achieve.

In an embodiment of the disclosure, the rings that cover the sealing plate also have a self-cleaning function even when dealing with sticky substances, and in particular sludge. In fact, when traces of the sticky substance remain stuck between the rings of the sealing plate, after some time such trace becomes dry and when the pipes are disconnected and re-connected again, it naturally falls off, helped by the thrust applied by the pushing plate to the sealing plate, leaving the mechanism always clean and functional.

In an embodiment of the disclosure, the circular shape of the sealing plate, the gasket and the rings allow the connection between the pipes to remain clean because the content of the pipes is not easily put in contact with the connecting point. Moreover, an automatic pushing system with an angle of 120° allows a misalignment of the mechanism up to 3° without compromising the tightness of the junction.

This summary is provided to introduce a selection of concepts in a simplified form that are further described in the detailed description and drawings. This summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 1 illustrates, also showing a possible conjunction between 2 pipes;

FIG. 1 illustrates, also showing a possible conjunction between 2 pipes and some of the components that are present in such conjunction which are at the center the air lock system.

DETAILED DESCRIPTION OF THE ILLUSTRATED EMBODIMENTS

Figure 1:
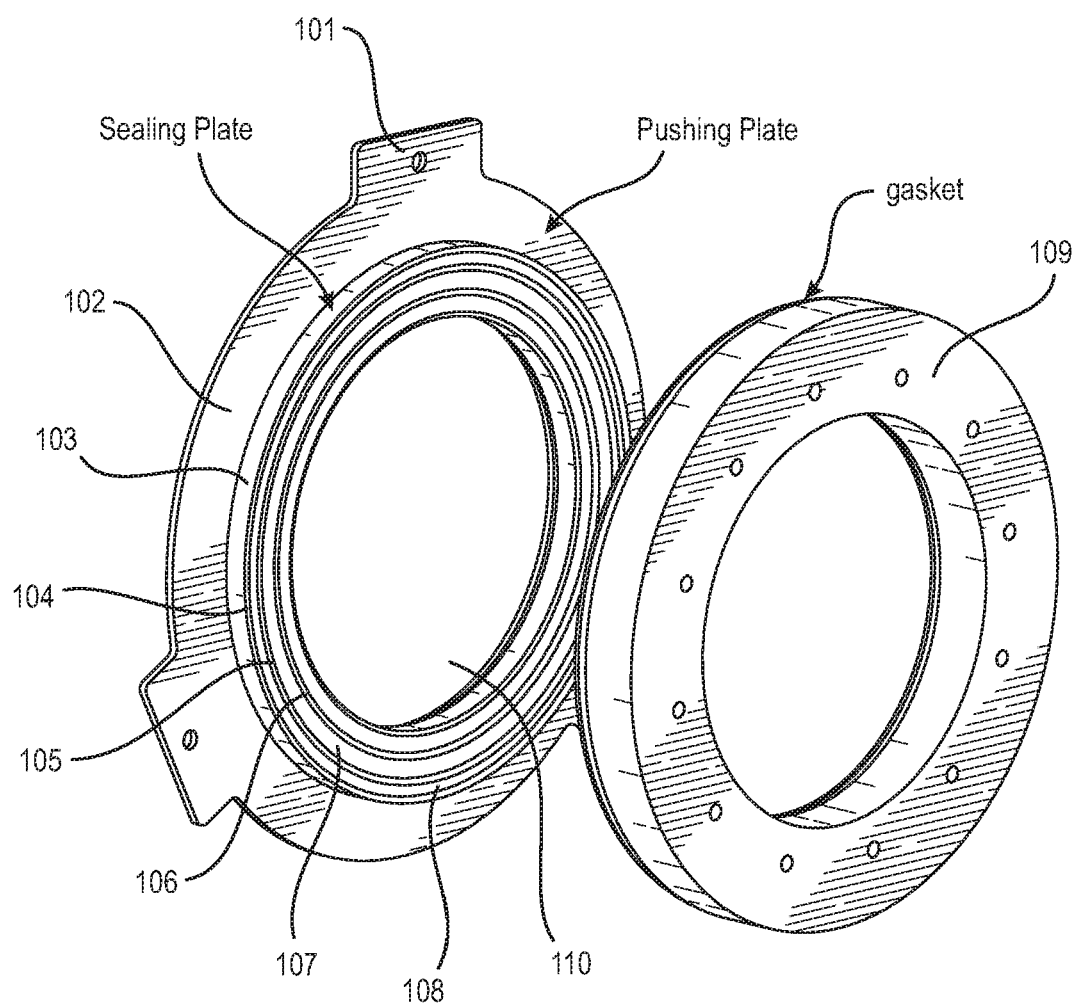
FIG. 1 provides a close representation of the air lock system with an example of how its main parts are arranged.
Figure 2:
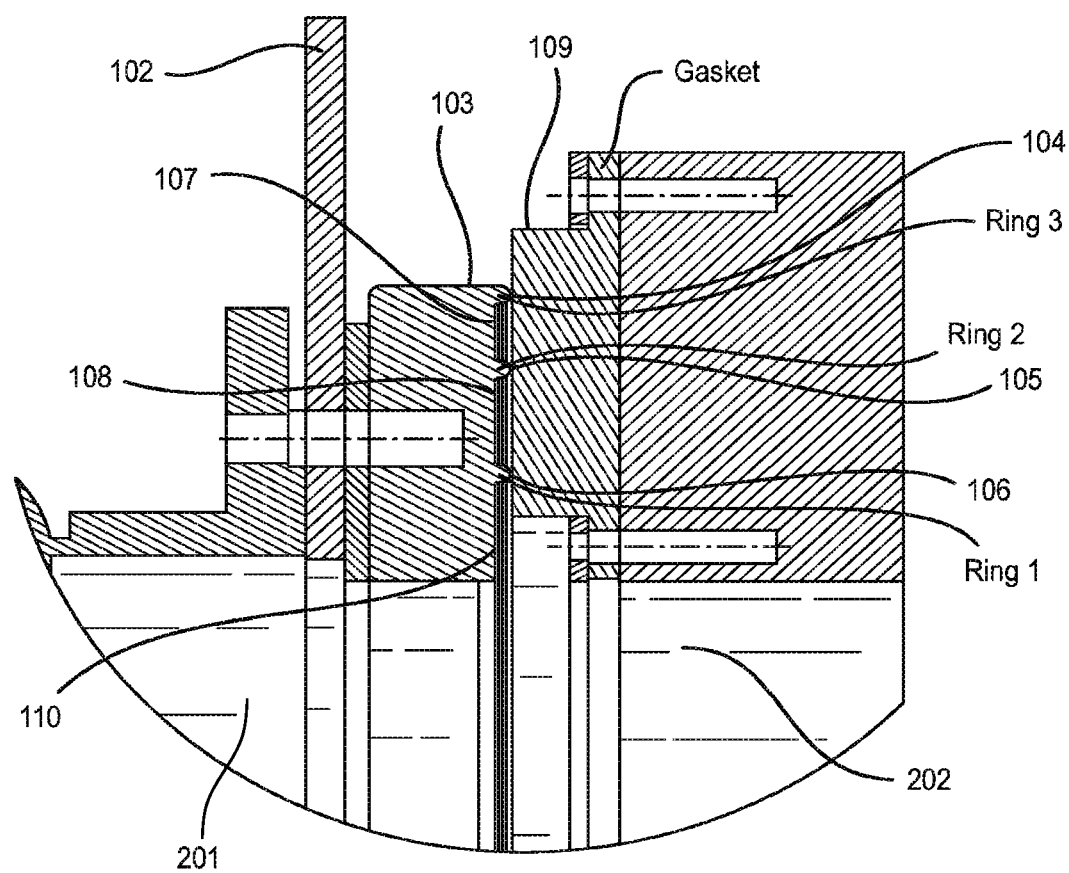
FIG. 2 is a half-section of what
Figure 3:
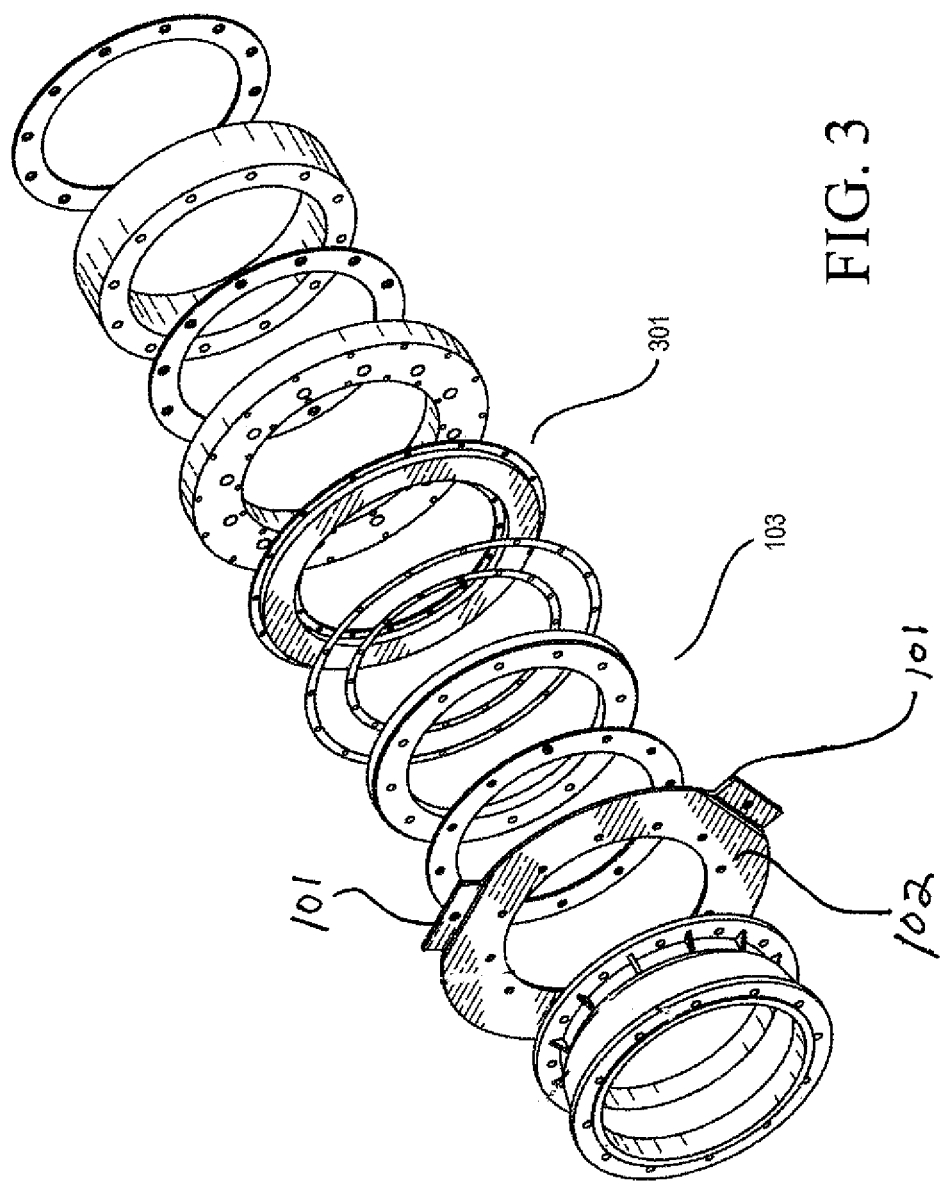
FIG. 3 is an example of a multiplicity of components that are present in a conjunction between two pipes and at the center the air lock system.
Figure 4:
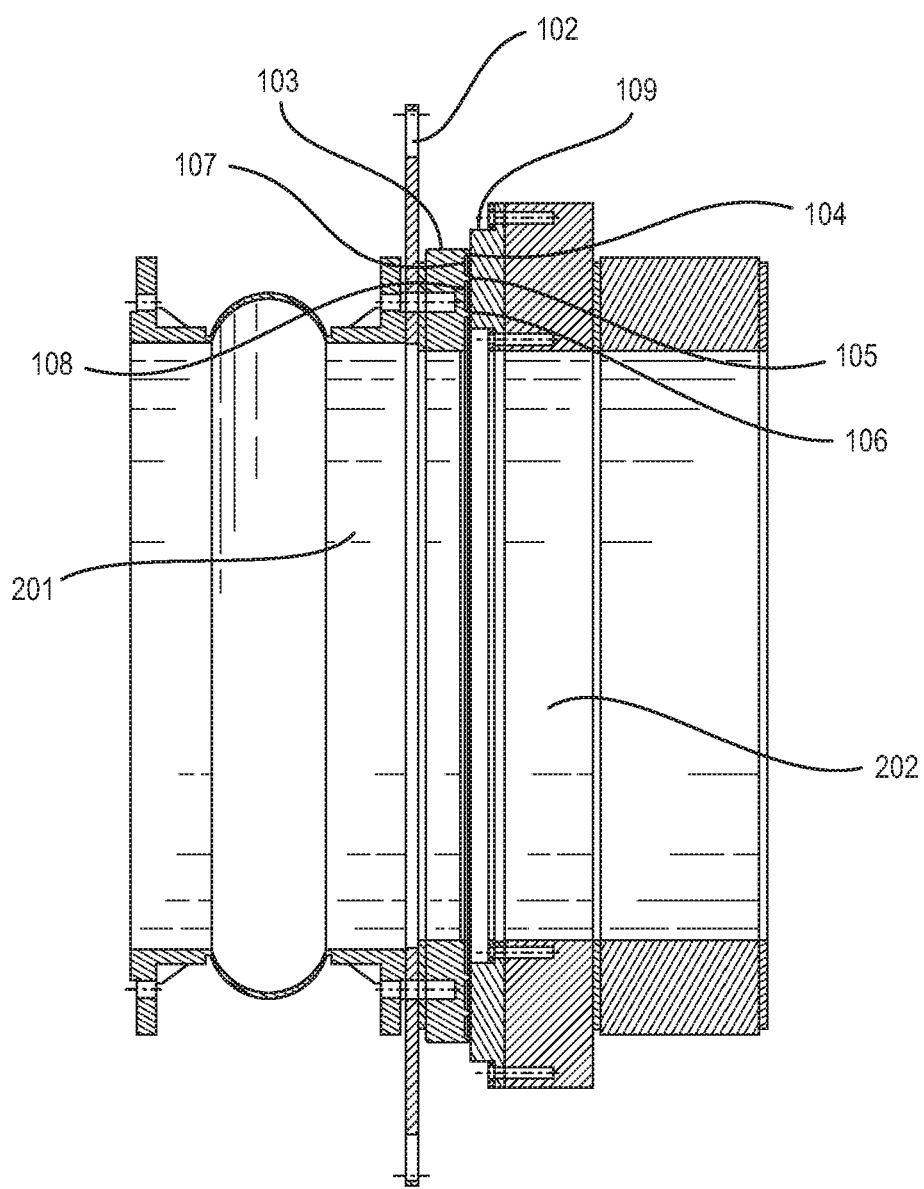
FIG. 4 is a section of what

Embodiments of the present disclosure comprise a method and a system to efficiently connect two 201, 202 or more pipes together. The efficiency of the connection is guaranteed by the combined use of pushing plates 102, sealing plates 103 and gaskets 109. In particular, in one of the embodiments of the invention the sealing plate contains multiple, concentric, protuberances 104, 105, 106. The protuberances 104, 105, 106 can also referred to as "rings". Such rings are located at a certain distance 107,108 one from the other so as to allow the pipe connection to be flexible: If the pipes 201, 202 are perfectly or almost perfectly aligned, the first ring 106 is used and the pipe 202 goes directly into that ring 106. If for some reason the pipes 201, 202 are not perfectly aligned, then the next concentric ring 105 is involved and it is used to connect the pipes 201,202 while preserving the tightness. And this system can be repeated in case of more serious misalignments with the more external rings 104. In one of the embodiments of the invention, such flexibility overcomes many difficult situations, including defects in the construction of the pipes and misalignments generated by wrong software computing. In one of the embodiments of the disclosure, such flexibility can also overcome a misalignment (vertical, horizontal or diagonal) of the pipes to be connected up to at least 20 mm at 1 bar pressure when at least 2 rings 105, 106 are present, which is something that in the past was impossible to achieve. It is to be noted that the protuberances 104,105,106 are preferably positioned at least 5 millimeters from one another.

In one of the embodiments of the disclosure, the distance 107, 108 between the rings 104, 105, 106 allows not only to preserve tightness in case of non-perfect alignment of the pipes 201,202 but it also allows hypothetic residues, traces of dirt or other materials to deposit in such space 107, 108. In this way, such material will not obstruct the conjunction between the pipes 201,202 compromising the tightness of the conjunction. Moreover, in one of the embodiments of the disclosure, such material will also naturally dry and, also thanks to the vibrations and movements of the pipes 201,202 when they rotate or translate or are pushed one against the other, fall off, so that the spaces 107, 108 will be clean again and the conjunction will not be obstructed. This can be referred to as the self-cleaning feature of the disclosure.

In one of the embodiments of the invention, one of the pipes 201 is pushed against the other, for example as to convey fluid, liquid, air or some other substance into the other pipe 202, wherein the first pipe 201 is pushed into the second one 202 thanks to a pushing plate 102. In one of the embodiments of the disclosure, such pushing plate 102 is bigger and higher than the other plates and is pushed in 3 precise points 101 put at 120° from the center of the pushing plate 102 so as to exercise force while preserving stability. In one of the embodiments of the invention, an automatic pushing system with an angle of 120° allows a misalignment of the mechanism up to 3° without compromising the tightness of the junction. In one of the embodiments, sensors are placed in the junction and in the pipes 201,202 so that the rotation or translation, or both, of the pipes 201,202 and the functioning of the conjunction, including the alignment of the pipes, is remotely and automatically controlled by software. A computer-control system is operatively connected to the pushing plate for moving the first pipe toward the second pipe such that one or more of the plurality of concentric protuberances disposed upon the sealing plate can engage the gasket disposed upon the second pipe and thereby establish fluidic integrity between the first and second pipes such that a fluid can flow between the first and second pipes without any leakage of fluid from either one of the first and second pipes, and for moving the first pipe away from the second pipe such that the first and second pipes can be easily and quickly fluidically disengaged from each other. The computer-control system moves the first pipe, the pushing plate, and the sealing plate toward the gasket fixedly mounted upon the second pipe in accordance with a signal received from a sensor operatively associated with one of the first and second pipes. It is also noted that the pushing plate 102 is larger than the sealing plate 103 by at least 10 millimeters. Still further, the computer-control system can apply a force of at least 200 N to the pushing plate 102.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Moreover, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above detailed description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above detailed description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly defines such terms. Accordingly, the actual scope of the invention encompasses not only the disclosed examples, but also all equivalent ways of practicing or implementing the invention under the claims.

What is claimed is:

1. A system for efficiently, easily, quickly, and repeatedly connecting and disconnecting two pipes together in a non-fixed manner, comprising:
    a first pipe defined around a first longitudinal axis;
    a second pipe defined around a second longitudinal axis;
    a pushing plate fixedly connected to said first pipe;
    a sealing plate fixedly connected to said pushing plate and said first pipe so as to be interposed between said pushing plate and said second pipe;
    a gasket fixedly connected to said second pipe so as to be interposed between said sealing plate and said second pipe when said first and second pipes are moved into engagement with each other;
    a plurality of concentric protuberances mounted upon said sealing plate and extending axially toward said gasket such that fluidic integrity is effectively defined and maintained between said first and second pipes even if said first and second pipes are slightly misaligned axially with respect to each other when said first and second pipes are moved into engagement with each other; and
    a computer-control system operatively connected to said pushing plate for moving said first pipe toward said second pipe such that one or more of said plurality of concentric protuberances disposed upon said sealing plate can engage said gasket disposed upon said second pipe and thereby establish fluidic integrity between said first and second pipes such that a fluid can flow between said first and second pipes without any leakage of fluid from either one of said first and second pipes, and for moving said first pipe away from said second pipe such that said first and second pipes can be easily and quickly fluidically disengaged from each other.

2. The system as set forth in claim 1, wherein said protuberances have a conical, ring, shape.

3. The system as set forth in claim 1, wherein said protuberances are positioned at least 5 millimeters from one another.

4. The system as set forth in claim 1, wherein one or both of said first and second pipes can rotate around their respective axes, translate along their respective axes, or both, with respect to each other.

5. The system as set forth in claim 4 wherein a sticky substance may be present between said protuberances.

6. The system as set forth in claim 4, wherein one or both of said first and second pipes can rotate around their respective axes such that said first and second pipes can be fluidically connected to each other regardless of any angular/rotational disposition of one of said first or second pipes with respect to the other one of said first or second pipes.

7. The system as set forth in claim 1, wherein said pushing plate is larger than said sealing plate by at least 10 millimeters, and said pushing plate is equipped with two or more wings positioned at equally-spaced angular positions upon said pushing plate where force is to be applied thereto by said computer-control system.

8. The system as set forth in claim 1, wherein said computer-control system moves said first pipe, said pushing plate, and said sealing plate toward said gasket fixedly mounted upon said second pipe in accordance with a signal received from a sensor operatively associated with one of said first and second pipes.

9. The system as set forth in claim 1, wherein said computer-control system can apply a force of at least 200 N to said pushing plate.

10. A method for efficiently, easily, quickly, and repeatedly connecting and disconnecting two pipes together in a non-fixed manner, comprising the steps of:
    providing a first pipe defined around a first longitudinal axis;
    providing a second pipe defined around a second longitudinal axis;
    fixedly connecting a pushing plate to said first pipe;
    fixedly connecting a sealing plate to said pushing plate and said first pipe so as to be interposed between said pushing plate and said second pipe;
    fixedly connecting a gasket to said second pipe so as to be interposed between said sealing plate and said second pipe when said first and second pipes are moved into engagement with each other;
    providing a plurality of concentric protuberances upon said sealing plate so as to extend axially toward said gasket such that fluidic integrity is effectively defined and maintained between said first and second pipes even if said first and second pipes are slightly axially misaligned with respect to each other when said first and second pipes are moved into engagement with each other; and
    operatively connecting a computer-control system to said pushing plate for moving said first pipe toward said second pipe such that one or more of said plurality of concentric protuberances disposed upon said sealing plate can engage said gasket of said second pipe and thereby establish fluidic integrity between said first and second pipes such that a fluid can flow between said first and second pipes without any leakage of the fluid from either one of said first and second pipes, and for moving said first pipe away from said second pipe such that said first and second pipes can be easily and quickly fluidically disengaged from each other.

11. The method as set forth in claim 10, wherein said protuberances have a conical, ring, shape.

12. The method as set forth in claim 10, wherein said protuberances are positioned at least 5 millimeters from one another.

13. The method as set forth in claim 10, wherein one or both of said first and second pipes can rotate around their respective axes, translate along their respective axes, or both, with respect to each other.

14. The system as set forth in claim 13, wherein one or both of said first and second pipes can rotate around their respective axes such that said first and second pipes can be fluidically connected to each other regardless of any angular/rotational disposition of one of said first or second pipes with respect to the other one of said first or second pipes.

15. The method as set forth in claim 10, wherein said pushing plate is larger than said sealing plate by at least 10 millimeters, and said pushing plate is equipped with two or more wings positioned at equally-spaced angular positions upon said pushing plate where force is to be applied thereto by said computer-control system.

16. The method as set forth in claim 10, wherein a sticky substance may be present between said protuberances.

17. The method as set forth in claim 10, wherein said computer-control system moves said first pipe, said pushing plate, and said sealing plate toward said gasket fixedly mounted upon said second pipe in accordance with a signal received from a sensor operatively associated with one of said first and second pipes.

18. The method as set forth in claim 10, wherein said computer-control system can apply a force of at least 200 N to said pushing plate.

* * * * *